Jan. 11, 1966 J. L. ROILAND 3,228,127
FLATWORK SPREADER AND FEEDER MACHINE
Filed Oct. 3, 1963 5 Sheets-Sheet 1

INVENTOR
JAMES L. ROILAND
BY
ATTORNEY

Jan. 11, 1966  J. L. ROILAND  3,228,127
FLATWORK SPREADER AND FEEDER MACHINE
Filed Oct. 3, 1963  5 Sheets-Sheet 3

INVENTOR
JAMES L. ROILAND
BY
ATTORNEY

Jan. 11, 1966   J. L. ROILAND   3,228,127
FLATWORK SPREADER AND FEEDER MACHINE
Filed Oct. 3, 1963   5 Sheets-Sheet 4

INVENTOR
JAMES L. ROILAND
BY
ATTORNEY

Jan. 11, 1966   J. L. ROILAND   3,228,127
FLATWORK SPREADER AND FEEDER MACHINE
Filed Oct. 3, 1963   5 Sheets-Sheet 5

INVENTOR
JAMES L. ROILAND
BY Rudolph P. Lowell
ATTORNEY

United States Patent Office 3,228,127
Patented Jan. 11, 1966

3,228,127
FLATWORK SPREADER AND FEEDER MACHINE
James L. Roiland, 1201 Walnut, Des Moines, Iowa
Filed Oct. 3, 1963, Ser. No. 313,701
13 Claims. (Cl. 38—143)

This invention relates to an article handling machine and more particularly to a machine and method for spreading a piece of flatwork and subsequently feeding the flatwork piece to a delivery area adjacent the input end of an ironing machine.

It is the object of the invention to provide an improved flatwork piece handling machine which is operated by a single attendant and functions to spread and smooth a flatwork piece and to feed the spread work piece to a delivery point adjacent the input end of an ironing machine.

Another object of the invention is to provide an improved method of spreading and smoothing a flatwork piece.

Still another object of the invention is to provide a work piece handling machine having a work piece spreader unit and a work piece feeder unit, which automatically moves a flatwork piece positioned in the spreader unit through the spreader unit and into the feeder unit.

A further object of the invention is to provide a work piece handling machine having a work piece spreader unit and a work piece feeder unit which are independently controlled to vary the speed of movement of the work piece through the respective units.

Another object of the invention is to provide a work piece feeder unit which is operable to simultaneously apply a longitudinal drag and lateral spreading force on a flatwork piece as it moves through the feeder unit so as to remove wrinkles therefrom.

Still another object of the invention is to provide a work piece spreader unit with transverse roller means engageable with the forward end of diverging conveyer means and operable to pick up the leading edge of a flatwork piece.

Another object of the invention is to provide in a work piece spreader unit a positive work piece feed means for inserting the work piece into the forward end of the spreader unit.

An additional object of the invention is to provide an automatic flatwork piece spreader and feeder machine which is sturdy and economical in construction and reliable and efficient in use.

These and other objects and advantages of this invention will become apparent from a consideration of the following specification and the accompanying drawing, wherein:

Figure 1:
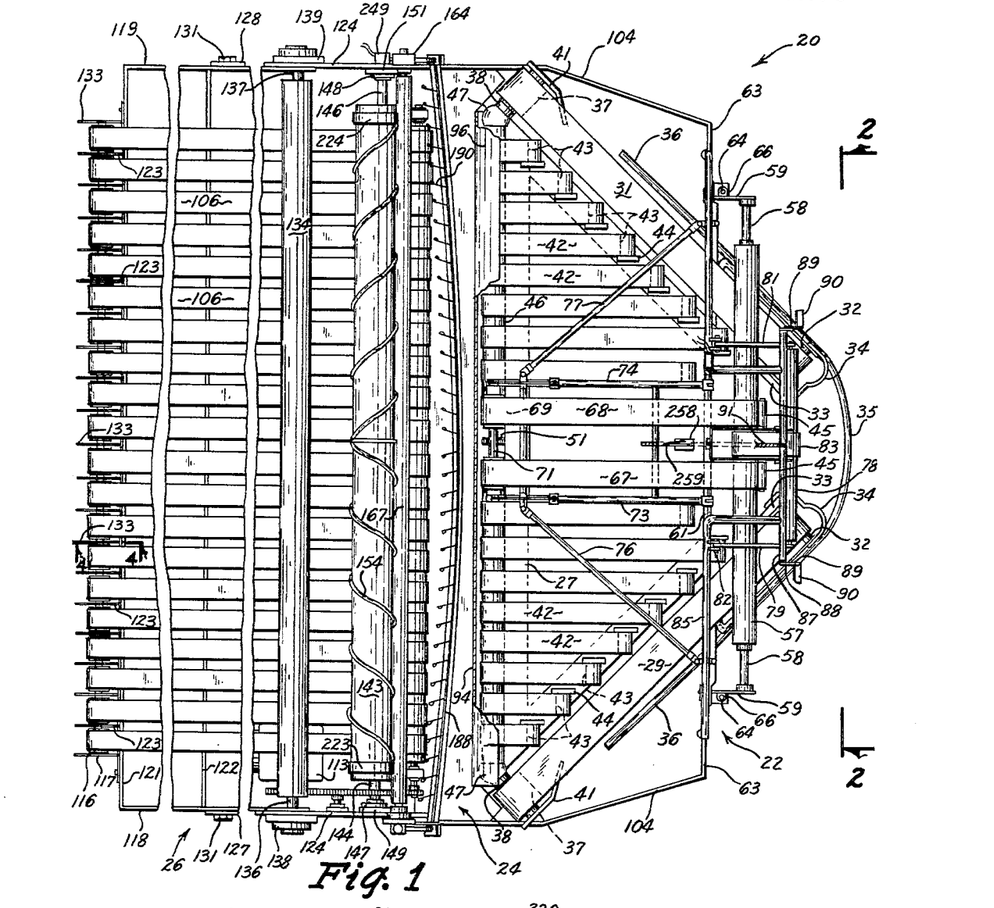
FIG. 1 is a plan view of the flatwork piece spreader and feeder machine of the invention.
Figures 3, 4:
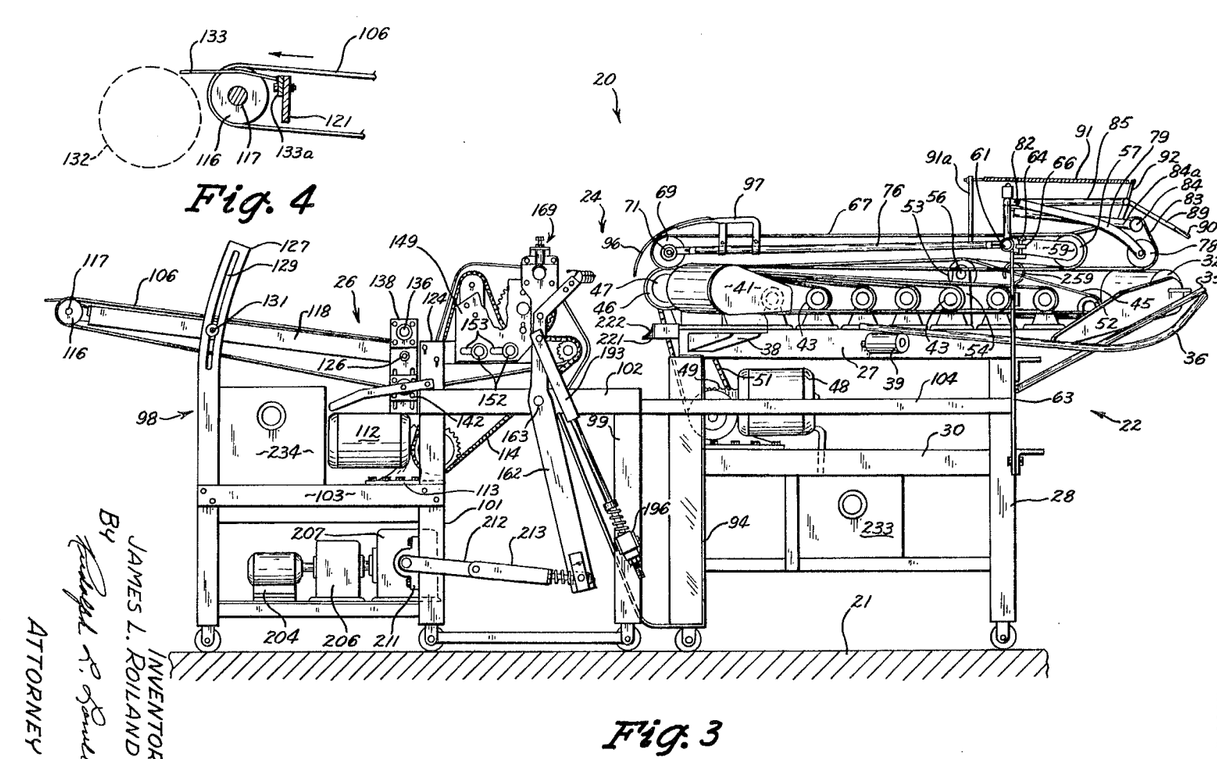
FIG. 3 is a side elevational view of the machine of FIG. 1.
FIG. 4 is an enlarged section taken along the line 4—4 of FIG. 1.

Referring to the drawing, there is shown in FIGS. 1 and 3 an article handling machine 20 positioned upon a supporting surface 21 such as a floor. The machine 20 is operated by a single attendant and functions to spread and smooth laundered flatwork pieces, such as sheets, table cloths, and bed spreads, and feed the spread work pieces to a delivery point adjacent the input end of an ironing machine. Included in the machine 20 is a spreader unit 22 for sequentially receiving work pieces from an attendant. The spreader unit 22 carries the work piece in a longitudinal direction and functions to spread the work piece laterally as it moves toward the outlet end of the spreader unit. From the spreader unit 22 the work piece is directed, by a work piece transfer assembly 24, to a feeder and smoothing unit 26. The transfer assembly 24 is operable to receive the trailing end section of the work piece as it is discharged from the spreader unit 22 and to move the trailing end section of the work piece to the input end of the feeder and smoothing unit 26. The work piece is moved longitudinally over the transfer assembly 24 by the feeder unit 26 to a delivery area defined by the discharge end of the feeder unit.

As shown in FIG. 3, the spreader unit 22 has horizontal frame members 27 and 30 supported above the surface 21 by a plurality of upwardly extended legs 28. As shown in FIG. 1, a pair of endless conveyer belts 29 and 31 are positioned on opposite sides of the frame members 27. The conveyer belts 29 and 31 are relatively diverged in a rearward direction so that each conveyer belt extends laterally and rearwardly from the center section of the forward end of the spreader unit 22. The forward ends of the conveyer belts extend around idler rolls 32 which are rotatably mounted on brackets 33 secured to the horizontal frame members 27. A curved work piece guide member 34 is positioned adjacent the forward end of each belt 29 and 31 and extends on opposite sides of the idler rolls 32. The opposite ends of each guide member 34 are secured to the brackets 33 adjacent the journals of the idler rolls 32. A curved upper guide bar 35 extends in a transverse direction forward of the idler rolls 32 across the space between the idler rolls 32. As shown in FIG. 3, the opposite ends of the bar 35 project in a downward and rearward direction and are secured to the front legs 28 of the frame. A second curved guide bar 36 is secured at its mid-section to the center portion of the bar 35 and extends rearwardly and outwardly adjacent the diverging belts 29 and 31. The bar 36 functions to hold the work piece moving through the spreader unit 22 out of engagement with the lower run of the belts 29 and 31.

The rear ends of the conveyer belts 29 and 31 are positioned about drive rolls 37 which are journaled in bearing brackets 38 carried by the frame 27. As shown in FIG. 3, the tension on the conveyer belts is maintained by idler rolls 39 which are adjustably mounted on the horizontal frame 27 and engage the lower surface of the bottom run of the belts. The outer ends of the drive rolls 37 are enclosed by guard plates 41.

Figure 13:
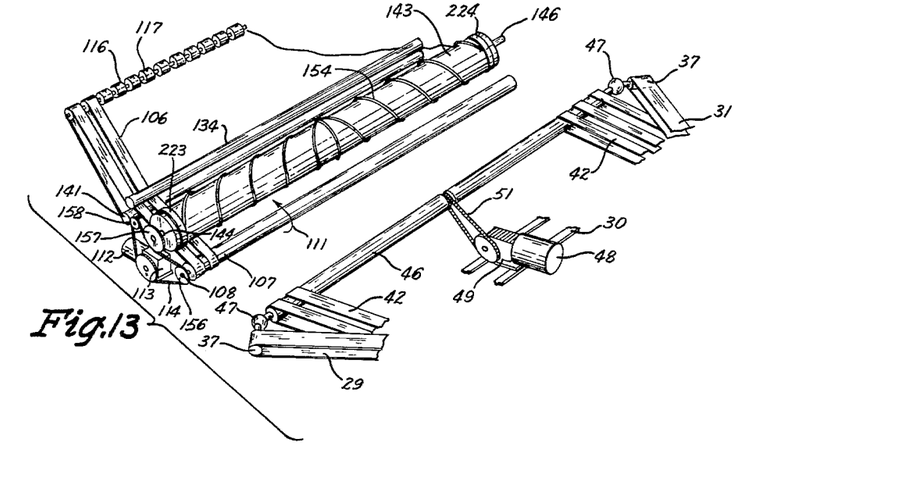
FIG. 13 is a diagram of the mechanical drive of the spreader unit and feed unit of the machine of FIG. 1.

Positioned between the diverging conveyer belts 29 and 31 are a plurality of longitudinally extended conveyer belts 42. The forward end of each belt 42 extends around an idler roll 43 which is carried by a bearing block 44 mounted on the horizontal frame 27 adjacent the rearward edge of the diverging conveyer belts 29 and 31. The rear ends of the conveyer belts 42 are positioned about a transversely extended drive roller 46 which is mounted on the horizontal frame 27 by bearings (not shown). The opposite ends of the shaft 46 are connected to the drive rolls 37 by bevel gears (not shown) contained within casings 47. The roller 46 is driven by a D.C. electric motor 48 which is connected to a speed reduction unit 49 mounted on the horizontal frame 30. A chain and sprocket drive 51 connects the speed reduction unit 49 to a mid-portion of the shaft 46 (FIG. 13).

A pair of central conveyer belts 45 (FIG. 1) are carried on forward idler rolls 52 rotatably secured to the horizontal frame 27. As shown in FIG. 3, the rolls 52 position the upper runs of the central conveyer belts 45 below the level of the upper run of the diverging conveyer belts 29 and 31. Intermediate the ends of the central conveyer belts 45, the upper run of each belt engages an idler roll 53 mounted on a transverse shaft 56 which is supported on the frame 27 by brackets 54. The idler roll 53 is positioned at an elevation above the plane of the top runs of the diverging conveyer belts 29 and 31 so as to position the intermediate portion of the centrally located conveyer belts 45 above the diverging belts 29 and 31.

A pressure roll 57 having an axial shaft 58 extended from the opposite ends of the roll is positioned transversely across the central conveyer belts 45 and engages the upper runs of the diverging conveyer belts 29 and 31 adjacent their front ends. The ends of the shaft 58 are journaled on a pair of arms 59 mounted on the opposite ends of a rod 61. The rod 61 is extended transversely across the conveyer belts 42 and 45 substantially parallel to and rearward of the pressure roll 57, and has its opposite ends positioned in a sleeve 62 which is secured to upwardly extended frame members 63. The pressure exerted by the roll 57 upon the top runs of the diverging spreader belts 29 and 31 is controlled by a pair of adjustable screws 64. Each screw 64 is threaded into a lateral projection 66 secured to an arm 59. The lower end of each screw 64 engages a portion of the frame member 63 thereby limiting the downward pivotal movement of the arms 59.

Positioned about the mid-portion of the pressure roll 57 are a pair of rearwardly extended endless belts 67 and 68. The lower run of each belt 67 and 68 extends parallel to and in engagement with the upper run of the center longitudinal belts 45. The rear ends of the belts 67 and 68 are positioned above the roller 46 by a pair of rollers 69 which are rotatably mounted on a transverse shaft 71. The opposite ends of the shaft 71 are rotatably connected to a pair of longitudinally extended tubular members 73 and 74 which are mounted at their forward ends to the transverse rod 61. The longitudinal position of the tubular members 73 and 74 is maintained by diagonal braces 76 and 77 which are interposed between the rear ends of the tubular members 73 and 74 and the opposite end sections of the rod 61.

A work piece pickup roller 78 is positioned immediately above and in engagement with the forward ends of the diagonal conveyer belts 29 and 31. The roller 78 is mounted for rotation about a transverse axis on the forward ends of a pair of downwardly curved arms 79 and 81. As shown in FIG. 3, the arm 79 projects in a forward and downward direction having the forward section thereof journaled to the end of the roller 78. The rear section of the arm 79 is pivotally connected by a pin 82 to a transverse member 85 positioned above and secured to the upwardly extended frame members 63. The arm 81 is spaced from the arm 79 and is substantially identical in construction therewith. The pivoting arms 79 and 81 place the weight of the roller 78 on the diverging conveyer belts 29 and 31 which rotate the roller 78.

In order to prevent the work piece from winding about the mid-section of the roll 78, a short longitudinal belt 83 extends about the pressure roll 57 and pickup roll 78. The tension on the belt 83 is maintained by an idler roller 84 rotatably mounted on a pair of arms 84a which are secured to and project forwardly from the transverse member 85. The belt 83 provides a drive connection between the roll 57 and the roll 81 so that the linear speed of the work piece moving through the spreader unit remains substantially constant.

A positive work piece feed unit is mounted on the transverse member 85 above the roll 78. This unit comprises a transverse tubular member 87 having a length substantially the same as the roll 78. The member 87 is secured to forward projecting sections of the member 85. Positioned within the tubular member 87 is a rod 88 which has secured to the opposite ends thereof crank arms 89 which terminate in outwardly extended flat ends 90. The arms 89 are of a length so that when they are rotated to a feed position the ends 90 are positioned in a contiguous relation with the upper runs of the belts 29 and 31.

Figure 2:
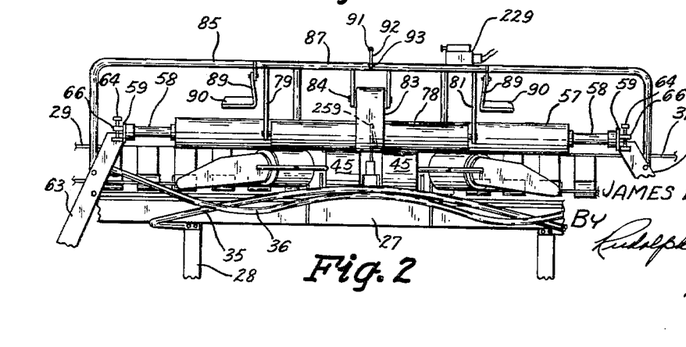
FIG. 2 is a partial front elevational view taken along the line 2—2 of FIG. 1.

The arms 89 are normally biased to an up position by a spring 91 connected at one end to a stationary leg 91a attached to the tubular members 73 and 74. The opposite end of the spring 91 is connected to a finger 92 secured to the mid-section of the rod 88. As shown in FIG. 2, the finger 92 extends through a slot 93 in the tubular member 87. The end walls of the slot 93 define the limits of the angular movement of the arms 89 which is about ninety degrees.

In the use of the spreader unit 22, flatwork pieces, such as sheets, spreads and table cloths, or the like, are fed by an attendant between the input bight of the pickup roll 78 and the diverging belts 29 and 31, respectively. This is accomplished by holding the leading edge of the work piece on the flat ends 90 of the arms 89 and rotating the arms in a downward direction placing the work piece in the bight of the roll 78 and coacting belts 29 and 31. These belts carry the work piece over the guide bars 35 and 36 onto the longitudinal conveyer belts 42 and 45 which act to carry the work piece in a rearward direction. Each diverging belt 29 and 31 exerts an oblique outward pull on the work piece so as to laterally spread the work piece as it moves toward the discharge end of the spreader unit 22.

The pressure roll 57 engages the work piece as it is carried by the diverging belts 29 and 31 and functions to feed the work piece to the engaging central belts 45 and 67 and 68. The central longitudinal belts 45 and the belts 67 and 68 prevent lateral movement of the center section of the work piece in either direction to provide for a feeding of the sheet in a longitudinal direction while the diverging belts 29 and 31 function to spread the work piece laterally at its side portions to remove wrinkles and creases therefrom.

The work piece is discharged from the spreader unit 22 into a V-shaped trough 94 which extends in a transverse direction and is secured to the frame 27 adjacent the rear of and below the roller 46. In order to insure the movement of the work piece into the trough 94 a downwardly curved housing 96 extends transversely adjacent the discharge end of the longitudinal belts 42 and 45. Bracket members 97 mount the housing 96 on the rear section of the tubular members 73 and 74.

As the work piece moves into the V-shaped trough 94 the work piece transfer assembly 24 picks up the trailing end section of the work piece and moves it to the feeder and smoothing unit 26. This action will be subsequently described in detail.

The feeder unit 26 has a frame 98 positioned on the supporting surface 21 and includes upwardly extended legs 99 and 101 and horizontal beams 102 and 103. The space relationship between the feeder unit 26 and the spreader unit 22 is maintained by forwardly extended side beams 104 which are secured to the beam 102 of the feeder unit and to the frame member 63 of the spreader unit.

Figures 5, 6, 7:
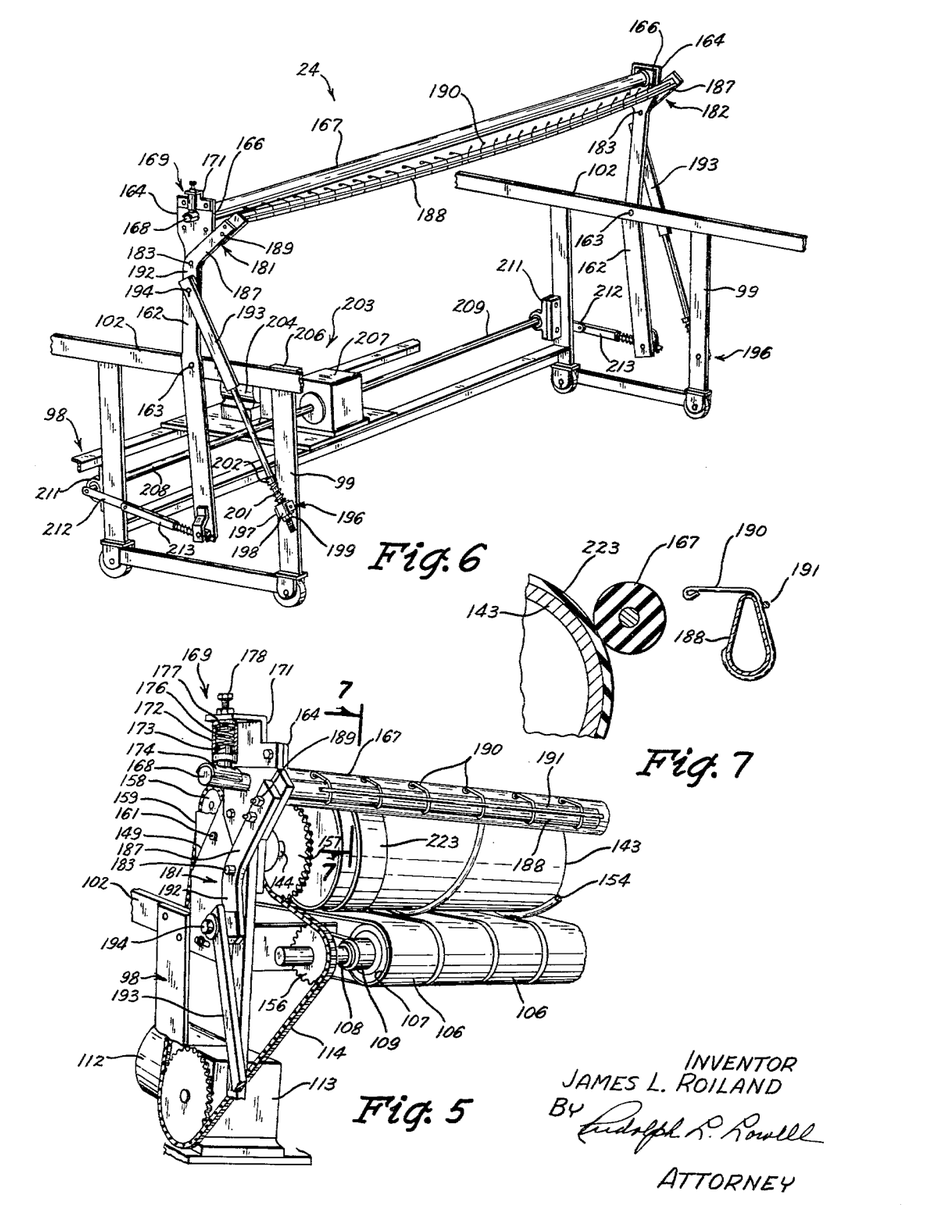
FIG. 5 is a fragmentary perspective view of the flatwork piece transfer assembly and the feeding conveyer of the machine.
FIG. 6 is an enlarged perspective view of the flatwork piece transfer assembly of the machine of FIG. 1.
FIG. 7 is an enlarged sectional view taken along the line 7—7 of FIG. 5.

A plurality of longitudinally extended endless belts 106 are positioned on the top section of the frame 98 in a spaced side-by-side relationship. The forward ends of the belts 106 extend about rollers 107 carried on a transverse shaft 108 the opposite ends of which are rotatably mounted on the beam 102 by bearing blocks 109 one of which is shown in FIG. 5.

Figures 10, 11, 12:
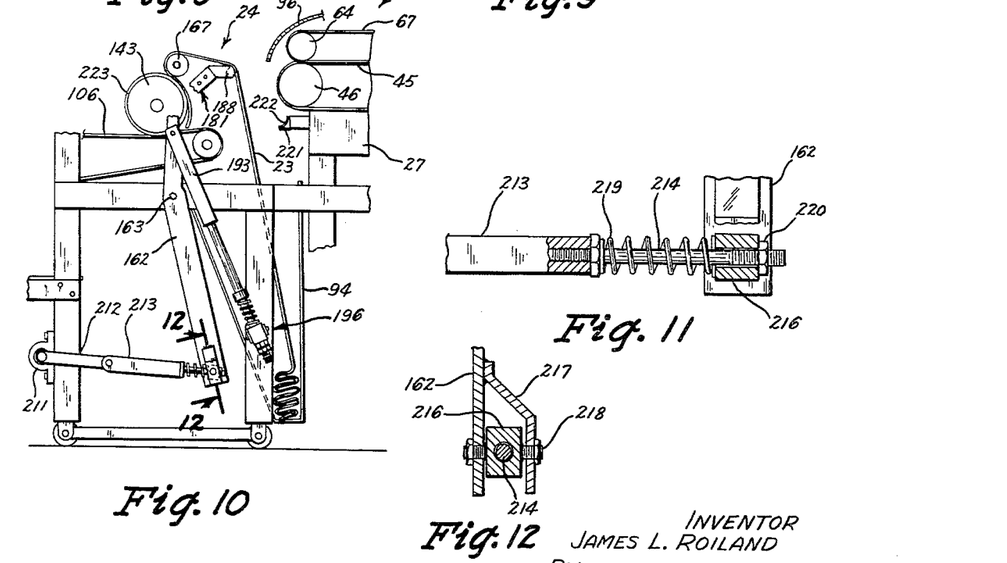
FIG. 10 is a side view similar to FIG. 8 showing the piece discharge position of the transfer assembly.
FIG. 11 is an enlarged sectional view of the pivotal joint between the crank link and transfer assembly lever.
FIG. 12 is an enlarged sectional view taken along the line 12—12 of FIG. 10.

As shown in FIG. 11, the shaft 108 and rollers 107 are rotated in the direction of the arrow 111 by a D.C. electric motor 112 having a power transmission mechanism 113 mounted on the beam 103. A chain and sprocket drive assembly 114 connects the power transmission unit 113 with the end of the shaft 108.

The outer or discharge end of the belts 106 extend around axially aligned rollers 116 mounted on a transverse shaft 117 that is positioned rearwardly of the frame 98 by a pair of arms 118 and 119 which are interconnected by transverse members 121 and 122. The transverse cross member 121 is connected to the rear ends of the arms 118 and 119 and has secured thereto a plurality of transversely spaced and rearwardly extended bearing brackets 123 for supporting the shaft 117. The inner ends of the arms 118 and 119 are pivotally mounted on horizontal plates 124 by nut and bolt assemblies 126.

The elevation of the discharge end of the belts 106 may be adjusted by pivoting the arms 118 and 119 about the nut and bolt assemblies 126. The arms 118 and 119 are held in their adjusted position by means including upwardly extended curved legs 127 and 128 positioned adjacent the arms 118 and 119, respectively. Each leg is secured to the forward end of the beam 103 and has an arcuate-shaped slot 129 in its upper end section. The arms 118 and 119 are connected to the legs 127 and 128 by nut and bolt assemblies 131 which extend through the slots 129 in the respective legs. An adjusted position of the arms 118 and 119 is maintained by the clamping action of the nut and bolt assemblies 131.

As shown in FIGS. 1 and 4, the flat work piece is guided onto the top of an ironer conveyor 132 by a plurality of spring fingers 133 which project rearwardly and downwardly from the ends of the belts 106. The fingers 133 extend between the rollers 116 and are secured at their forward ends to a transverse bar 133a bolted to the cross member 121. The mid-section of the fingers 133 curves upwardly positioning the fingers adjacent the top runs of the belts 106.

As shown in FIG. 1, a continuous press roller 134 extends transversely across the belts 106 in engagement with the top runs of the belts. Projecting from the opposite ends of the transverse roll 134 are stub shafts 136 and 137 which are rotatably mounted by means of bearing blocks 138 and 139 secured to the plates 124. As shown in FIG. 13, an idler roll 141 is positioned below the transverse roll 134 for engaging the top sides of the lower runs of the belts 106. Vertically adjustable bearing blocks 142, one of which is shown in FIG. 3, rotatably mount the ends of the idler roll 141 on the frame 98 and are adjustably mounted on the frame 98 to vertically adjust the idler roll 141 to vary the tension on the belts 106.

As shown in FIG. 1, a large diameter roller 143 extends transversely across the belts 106 adjacent the forward ends thereof. The roller 143 has stub shafts 144 and 146 at its opposite ends that are carried in bearing brackets 147 and 148 which are mounted on upwardly extended plates 149 and 151, respectively. Nut and bolt assemblies 152 project through longitudinally extended slots 153 in the plates 149 and 151 to adjustably mount the plates 149 and 151 on the frame plates 124. As shown in FIG. 1, a spiral ribbon or rod 154 is secured to the peripheral surface of the roller 143. The ribbon 154 is reversely pitched or wound in opposite helical directions from the mid-section of the roller 143 and functions to apply oppositely directed lateral forces to the work piece carried by the feeder and smoothing unit 26. The roller 143 is driven at a peripheral speed which is fifteen to twenty feet per minute slower than the peripheral speed of the belts 106 and thus applies a drag force on the work piece as it moves longitudinally through the feeder unit 26.

As shown in FIG. 5, the drive shaft 108 for the belts 106 carries a sprocket 156. The shaft 146 of the roller 143 carries a sprocket 157 which is larger than and aligned with the sprocket 156. The chain of the drive assembly 114 is positioned over the sprocket 156 and under the sprocket 157. An idler sprocket 158 maintains the chain in engagement with the sprocket 157. The sprocket 158 is positioned rearwardly and above the sprocket 157 and is rotatably mounted on a bracket 159 secured to the plate 149 by nut and bolt assemblies 161. With this arrangement the roller 143 is driven in a reversed direction relative to the shaft 108 to move the work pieces onto the forward ends of the belts 106.

As shown in FIG. 6, the work piece transfer assembly 24 has a pair of transversely spaced upwardly extended levers 162. Each lever is pivoted at its mid-section by a pin 163 extended from a side of the horizontal beams 102. The upper section of each lever 162 has an enlarged head 164 which carries a bearing member 166. A transversely extended roller 167 having a rubber cover is provided with stub shafts 168 and is rotatably mounted in the bearings 166 such that the stub shafts 168 project through the heads 164. A continuous brake assembly 169 mounted on the head 164 by bracket 171 engages the stub shaft 168 of the roller.

As shown in FIG. 5, the continuous brake assembly 169 comprises a cylindrical casing 172 secured to the bracket 171 extended in a downward direction terminating adjacent the roller stub shaft 168. A plunger 173 having an arcuate brake shoe 174 secured to the outer end of the plunger 173 is slidably disposed in the casing 172 with the brake shoe 174 in engagement with the roller stub shaft 168. A coil spring 176 is positioned between a disc 177 and the plunger 173. The disc 177 is positioned in the casing 172 and is in engagement with a bolt 178 threaded in the end of the casing 172. Compression of the spring 176 is varied by adjusting the bolt 178 thereby controlling the drag characteristics of the brake shoe 174 on the roller stub shaft 168.

A pair of bell cranks 181 and 182 are pivotally mounted on the upper sections of the levers 162 immediately below the heads 164 thereof by pins 183. Each bell crank has an upwardly and forwardly extended arm 187. A transverse beam or rod 188 having a forward bowed or arcuate shape is connected to ends of the arms 187 by bolts 189. As shown in FIG. 7, the bowed member 188 is egg-shaped in cross section with the blunt side positioned in the downward direction. As illustrated in FIGS. 1 and 6, a plurality of spaced fingers 190 are secured to the beam 188. The fingers 190 on each side of the center of the beam project rearwardly from the top of the beam at an outward angle of about fifteen degrees with respect to the longitudinal axis of the machine. This angular disposition of the fingers 190 has a spreading action on the work piece as it is moved over the beam 188. Secured to the forward side of the fingers 190 adjacent the top of the beam 188 is a transverse rod 191 which maintains the transverse space relationship between the fingers 190 and keeps the work piece from draping between the spaced fingers.

The lower arms 192 of the bell cranks 181 and 182 extend in a downward direction and are pivotally connected to links 193 by pins 194. The links 193 extend downwardly and in a forward direction with the lower end of each link pivotally connected to the legs 99 by swivel blocks 196.

As shown in FIG. 6, each block 196 has a U-shaped member 197 pivotally connected to the adjacent leg 99 for movement about a horizontal axis. Positioned within the U-shaped member 197 is a block 198 pivoted to the sides of the member 197 for movement about an axis normal to the axis of movement of the member 197 and normal to the longitudinal axis of the link 193. The lower ends of the links 193 are cylindrical in shape and slidably project through the blocks 198. Nuts 199 threaded on the ends of the rod which projects through the blocks 198 function to adjust the effective length of the links 193 thereby controlling the angular position of the bell cranks 181 and 182 with respect to the lower heads 164. A spring 201 positioned about each rod and held in engagement with the block 198 by a collar 202 biases the nut 199 into engagement with the block 198 and provides for relative movement between the rod and block 198. (See FIG. 9.)

The angular position of the rubber roller 167 and the bowed beam 188 is controlled by a power unit 203 carried by the frame 98 below the belts 106. As shown in FIG. 6, the power unit 203 comprises a D.C. motor 204 connected to an electromagnetic clutch-brake 206 which in turn drives a power transmission 207. The clutch-brake 206 is a commercial mechanism such as the Warner PCB500 Clutch-Brake Coupling manufactured by the Warner Brake Company, Beloit, Wisconsin.

Extended from opposite sides of the transmission 206 are drive shafts 208 and 209. The outside end section of each shaft is carried by bearings 211 mounted on the frame 98. Crank arms 212 are connected to the outer ends of the shafts 208 and 209 and are positioned outwardly from the legs 101. The ends of the crank arms 212 are connected to the bottom sections of the levers 162 by links 213. The forward end of each link 213 is pivotally mounted on the end of the corresponding crank arm 212.

As shown in FIG. 11, the opposite end of each link 213 includes a rod 214 threaded into the forward portion of the link 213 and slidably mounted in a swivel block 216 carried by the bottom section of the lever 162. As illustrated in FIG. 12, the block 216 is positioned between the lever 162 and a bracket 217 secured to the side of the lever. The block 216 is provided with oppositely projecting studs 218 which project through the lever 162 and bracket 217 and pivotally mount the block 216 for movement about a horizontal axis.

A nut 220 is threaded on the end of the rod 214 which projects through the block 216. The nut 220 is held in engagement with the block 216 by a spring 219 positioned about the rod 214 on the opposite side of the block 216. The spring 219 functions to maintain the yieldable working length of the link 213.

Figure 9:
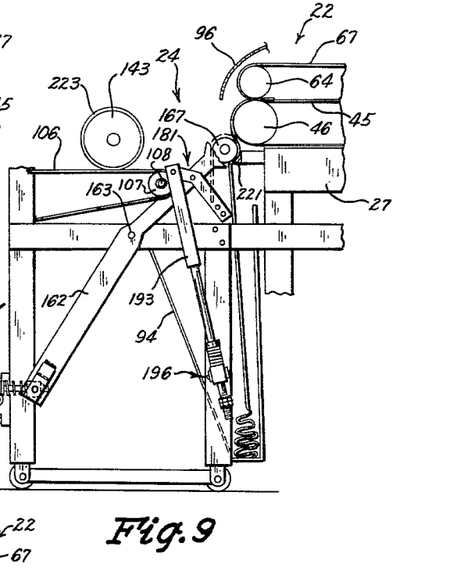
FIG. 9 is a side view similar to FIG. 8 showing the piece pickup position of the transfer assembly.

On rotation of the shafts 208 and 209, the crank arms 212 reciprocate the links 213 which angularly move the levers 162 to a forward position as shown in FIG. 9. In the forward position the rubber roller 167 is in engagement with a transverse stop member 221 secured to the spreader unit frame 27 below the roller 47. The stop member 221 has a concave surface 222 which is engageable with the roller 167 when it is in the forward position. After the crank arms 212 have completed one revolution the roller 167 is positioned in engagement with the spiral rods 154 on the roller 143. In order to drive the roller 167 and reduce the pressure of the rubber roller 167 on the rods 154, annular rubber rings 223 and 224 are mounted on the opposite end sections of the roller 143. The rings 223 and 224 contact the roller 167 when it is in its normal position as shown in FIGS. 1 and 10.

Figure 14:
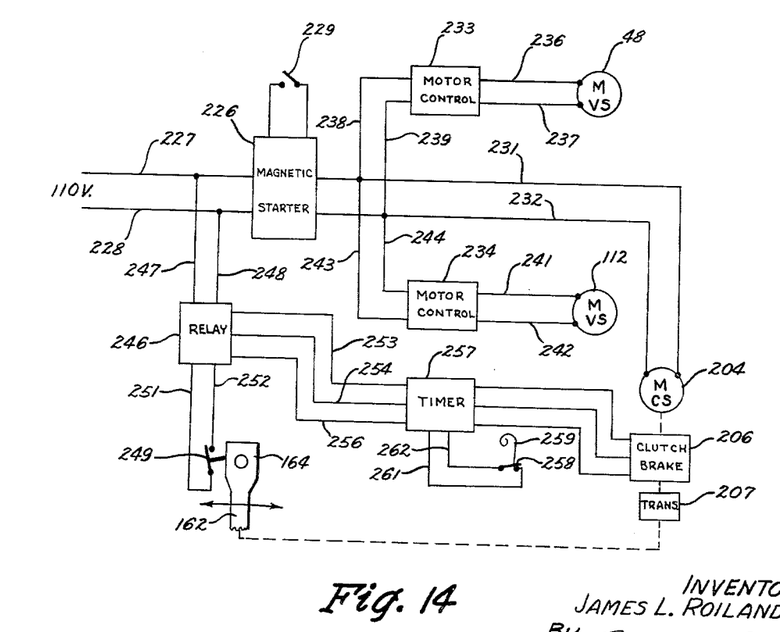
FIG. 14 is the electrical circuit diagram of the machine of FIG. 1.

The electrical control system for the spreader unit 22, and the work transfer assembly 24, and the feeder unit 26 is shown in FIG. 14. A 110 v. power supply is connected to a magnetic starter 226 by lines 227 and 228. The magnetic starter 226 is a commercial unit manufactured and sold by the General Electric Company as Model No. CR106K104. An attendant controlled on-off switch 229 mounted on the transverse member 85, as illustrated in FIG. 2, controls the operation of the magnetic starter 226.

The A.C. motor 204 is connected to the magnetic starter 226 by lines 231 and 232 and is energized in response to the operation of the magnetic starter 226. The D.C. motors 48 and 112 are connected to D.C. motor controls 233 and 234 which function to convert the A.C. power from the magnetic starter to D.C. power. Lines 236 and 237 connect the D.C. motor 48 to the motor control 233 which in turn is connected to the magnetic starter 226 by lines 238 and 239. Lines 241 and 242 connect the D.C. motor 112 to the motor control 234 which in turn is connected to the magnetic starter 226 by lines 243 and 244. The motor controls 233 and 234 include variable control members which function to control the power supply to the respective D.C. motors and thus regulate the speeds of these motors. The D.C. motor controls 233 and 234 are commercial units manufactured by the Boston Gear Works of Quincy, Massachusetts as Boston Ratio-Trol Model No. R50.

The power source is connected to a relay 246 by lines 247 and 248. The relay 246 is a commercial unit manufactured by the General Electric Company as Model No. CR2790E101A2. The relay 246 is operable in response to the closing of a microswitch 249 to connect the power source to the solenoid controls of the clutch-brake 206. The micro-switch 249 is connected to the relay by lines 251 and 252 and is mounted on the feeder unit frame plate 124 adjacent the forward side of the head 164 of the lever 162. When the lever 162 is in its normal position the head 164 holds the micro-switch 249 in an open position.

Interposed in lines 253, 254, and 256, which connect the relay 246 with the solenoid controls of the clutch-brake 206, is an electronic timer 257. A micro-switch 258 which has a spring finger control 259 is connected to the timer by lines 261 and 262. As shown in FIG. 3, the micro-switch 258 is mounted on the horizontal frame 27 of the spreader unit 22 with a spring finger 259 projected in an upward direction between the central longitudinal belts 45. The finger 259 is engageable with the work piece as it moves with the belts 42 and 45. The timer 257 is a commercial unit manufactured by the General Electric Company as Model No. CR7504A142. The micro-switch 258 is normally closed and is held in the open position by the work piece as it moves longitudinally through the spreader unit 22.

When the trailing edge of the work piece leaves the feeler finger 259 a micro-switch 258 automatically moves to a closed position thereby energizing the electronic timer 257. The timer functions to momentarily connect the power supply to the solenoid control of the clutch-brake 206 which in turn couples the power train of the electric motor 204 with the transmission 207. The operation of the transmission 207 moves the crank arms 212 which effects an angular movement of the levers 162. The movement of the head 164 of the lever 162 away from the limit switch 249 closes this limit switch thereby actuating the relay 246 to connect the power supply to the solenoid controls of the clutch-brake 206. The clutch-brake 206 continues to operate until the limit switch 249 is opened by the return movement of the lever 162. This is accomplished after the crank arms 212 have completed one revolution.

To operate the feeder and spreader machine 20, the attendant closes the on-off switch 229 mounted on the transverse member 85. When the switch 229 is closed the magnetic starter 226 is energized and operates to supply power to the motors 48, 112, and 204.

As shown in FIG. 13, the motor 48 drives the speed reduction unit 49 to rotate the roller 46 which is connected to the speed reduction unit 49 by chain and sprocket drive 51. The roller 46 drives the endless longitudinal belts 42 and 45 and through the universal couplings of the casings 47 drives the rollers 37 for the diverging endless belts 29 and 31. The upper runs of the belts 42 and 45 move in a rearward direction and the upper runs of the diverging belts move in a rearward and outward direction. The linear speed of the diverging belts 29 and 31 is greater than the linear speed of the longitudinal belts 42 and 45 and is correlated such that the longitudinal component of the linear speed of the diverging belts is substantially equal to the longitudinal movement of the belts 42 and 45.

To start the flatwork piece through the machine the attendant holds the leading edge of the work piece in engagement with the flat end 90 of the positive work piece feed unit. The attendant rotates the ends 90 in a downward direction to position the sheet in a contiguous relation with the upper runs of the belts 29 and 31 and under the pickup roll 78. When the ends 90 are released the spring 91 biases the feed unit to its normal position. The remaining portion of the work piece is draped over the curved guide members 35 and 36 which aid in the lateral spreading of the work piece as it moves into the spreader unit 22. The pickup roller 78 and the endless belt 83 positioned about this roller longitudinally moves the work piece into the forward ends of the belts 42 and 45 and the upper belts 67 and 68. The diverging belts 29 and 31 exert an opposite lateral force on the work piece as it moves in a longitudinal direction and thereby effects a lateral spreading action on the work piece.

As the work piece moves toward the rear section of the spreader unit 22 the leading edge engages the spring finger 259 moving it in a rearward direction to open the micro-switch 258. The micro-switch 258 will remain in an open position until the trailing edge of the work piece leaves the feeler finger 259.

Figure 8:
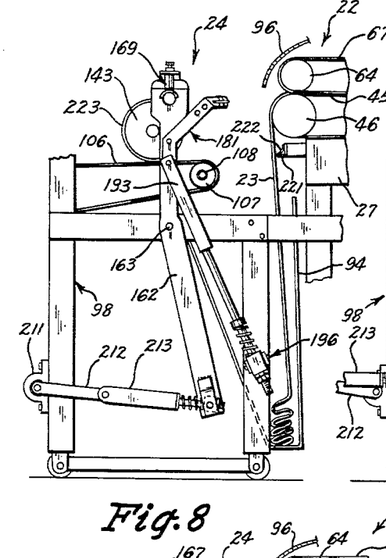
FIG. 8 is a fragmentary side view of the machine showing the normal position of the transfer assembly.

As shown in FIG. 8, the work piece 23 is deflected by the arcuate housing 96 into the V-shaped trough 94. As the trailing edge of the flatwork piece 23 moves from the spring finger 259 the micro-switch 258 returns to its normally closed position thereby actuating the timer 257 to energize the relay 246 which in turn connects the power supply to the solenoid control to the clutch-brake 206. With the clutch-brake 206 in a power transmitting condition, the power transmission 207 rotates the shafts 208 and 209 thereby turning the crank arms 212 and effecting an angular movement of the levers 162.

The levers 162 angularly move the roller 167 into engagement with the stop member 221 to clamp the work piece between the rubber roller 167 and the curved surface 222 of the stop member. This relationship is shown in FIG. 9. The trailing end section of the work piece 23 continues to move over the roller 167 and falls on the opposite side thereof as shown in FIG. 9 by the broken line. The bowed beam 188 carried on the crank arms 181 and 182 is rotated by the links 193 into a position immediately below the roller 167 when the transfer assembly is in the work piece pickup position, as shown in FIG. 9.

The continued rotation of the crank arms 212 moves the roller 167 in a rearward direction and simultaneously rotates the crank members 181 and 182 to move the bowed member in a horizontal plane in alignment with the rubber roller 167. In this position the angularly disposed fingers 190 on the bowed beam 188 are substantially horizontal.

The continuous brake 169 coacts with the stub shaft 168 of the roller 167 to prevent rotation of the roller 167 during the angular movement thereof toward the feeder unit 26. Thus, the work piece remains draped over the roller 167 and is moved into engagement with the spiral rods 154 on the roller 143. The rubber rings 223 and 224 being in engagement with the roller 167 drive the roller 167 and as shown in FIG. 10 moves the work piece in a downward direction onto the longitudinal belts 106 of the feeder unit 26. As the work piece 23 is pulled over the bowed member 188 it is spread in opposite lateral directions because of the arcuate contour of the beam 188 and the angular relationship of the fingers 190 with respect to the longitudinal axis of the machine.

As shown in FIG. 13, the D.C. motor 112 is drivably connected to the power transmission mechanism 113 drivably connected to the chain and sprocket assembly 114 which is coupled to the drive shaft 108 for the belts 106 and the drive shaft 146 for the roller 143. The roller 143 has a peripheral speed which is fifteen to twenty feet per minute slower than the movement of the belts 106. This results in a drag on the work piece as it longitudinally moves with the belts 106. The oppositely wound spiral ribbon 154 secured to the peripheral surafce of the roller 143 produces lateral forces in opposite directions on the work piece to effect a spreading and smoothing of the work piece as it travels between the roller 143 and the rubber roller 167 and between the roller 143 and the belts 106.

The belts 106 carry the work piece in a longitudinal direction under the transverse press roller 134 to the discharge end of the feeder unit 26. The spring fingers 133 guide the work piece into the input end of an ironing machine.

As shown in FIG. 3, the elevation of the discharge end of the belts 106 may be adjusted so that the work piece may be fed directly into an ironing machine. This adjustment is effected by releasing the nut and bolt assemblies 131 and pivoting the arms 118 and 119 about the bolts 126. The nut and bolt assemblies 131 move in the arcuate slots 129 in the legs 127 and 128. The adjusted position of the arms 118 and 119 is maintained by tightening the nut and bolt assemblies 131. The speed of the D.C. electric motor 112 may be manually controlled by the adjustment of the variable control means in the motor control 234. Thus, the speed of operation of the feeder unit 26 may be controlled independently of the operation of the spreader unit 22 and may be coordinated with the speed of operation of the ironing machine positioned adjacent the discharge ends of the belts 106.

A second work piece may be inserted into the spreader unit 22 as soon as the first work piece has moved from under the pickup roll 78, because the feeder unit 26 and transfer assembly 28 operate independently of the spreader unit 22. The opening of the micro-switch 258 by the second work piece does not affect the operation of the transfer assembly 24. The clutch-brake 206 of the transfer assembly 24 is actuated in response to the closing of the micro-switch 258. Thus, it is essential that the trailing edge of the first work piece be spaced from the leading edge of the second work piece. In order to attain the maximum output for the machine 20 the space between the respective sheets should be held at a minimum.

In summary, the work piece handling machine 20 of this invention is operated by a single attendant and the spreader unit 22 which functions to spread and smooth a flatwork piece and feed the work piece to a transfer assembly 24 which picks up the trailing edge section of the work piece as it discharged from the spreader unit. The transfer assembly 24 carries the work piece into engagement with a driven transverse roller 143 mounted on a work piece feeder unit 26. The roller 143 functions to position the flat work piece onto conveyer belts 106 which move the work piece over the transfer assembly 24 to a delivery point adjacent the input end of an ironing machine.

The invention has been described with respect to a preferred embodiment thereof. It is to be understood that it is not to be so limited since changes can be made therein which are within the full intended scope of this invention as defined by the appended claims.

I claim:

1. A machine for spreading and feeding a flatwork piece comprising:
   (a) a spreader unit having a work piece input end and a work piece output end, said spreader unit operable to receive a flatwork piece at the input end and to spread the piece during movement thereof toward the output end,
   (b) a feeder unit having a work piece input end and a work piece output end, said input end positioned rearwardly of the output end of the spreader unit,
   (c) a work piece transfer assembly positioned between the spreader unit and feeder unit and operable to receive and arrest the movement of the trailing end section of the work piece from the spreader unit and to move said arrested trailing end section to the input end of the feeder unit, and
   (d) control means for said transfer assembly operable in response to the position of the work piece on the spreader unit to actuate said transfer assembly to move the arrested trailing end of said work piece from the output end of the spreader to the input end of the feeder unit.

2. The machine defined in claim 1 wherein said transfer assembly includes:
   (a) frame means,
   (b) lever means pivotally mounted at the mid-section thereof to the frame means, one end of said lever means movable from adjacent the output end of the spreader unit to the input end of the feeder unit,
   (c) roller means rotatably mounted on said one end of the lever means and extended transversely of the spreader unit and feeder unit,
   (d) means connecting the control means to the other end of said lever means whereby upon actuation of said control means the roller means is carried by said lever means adjacent the output end of the spreader unit and subsequently moved to a position adjacent the input end of the feeder unit,
   (e) crank means pivotally connected at the mid-section thereof to said one end of the lever,
   (f) a beam connected to one end of said crank means and extended transversely of said spreader unit, said beam positioned between the spreader unit and roller means, and
   (g) link means pivotally connected at one end thereof to the other end of said crank means and connected at the other end thereof to the frame means, said link means operative to hold the crank means in a position placing the beam between the spreader unit and roller means when said one end of the lever means is adjacent the input end of the feeder unit and operative in response to movement of said one end of the lever means toward the output end of the spreader unit to rotate said crank means to position said beam below said roller means.

3. The machine defined in claim 1 wherein said transfer assembly includes:
   (a) frame means,
   (b) lever means pivotally mounted to the frame means, one end of said lever means movable from adjacent the output end of the spreader unit to the input end of the feeder unit,
   (c) roller means rotatably mounted on said one end of the lever means and extended transversely of the spreader unit and feeder unit, and
   (d) means connecting the control means to the other end of said lever means whereby upon actuation of said control means the roller means is carried by said lever means adjacent the output end of the spreader unit and subsequently moved to a position adjacent the input end of the feeder unit.

4. A machine for spreading and feeding a flatwork piece to a delivery point comprising:
   (a) spreader means having a work piece input end and a work piece output end, said spreader means having means operable to receive a flatwork piece at the input end and to move the work piece toward the output end simultaneously spreading the work piece during movement thereof toward the output end,
   (b) feeder means for moving a work piece to a delivery point, said feeder means having a work piece input end and a work piece output end, said input end positioned rearwardly and adjacent the output end of said spreader means, and
   (c) work piece transfer means positioned between the spreader means and feeder means, said transfer means including movable means for receiving and arresting the movement of a trailing section of the work piece and moving said arrested trailing section to the input end of the feeder means.

5. A machine for spreading and feeding a flatwork piece comprising:
   (a) a spreader unit including longitudinal conveyer means having a work piece input end and a work piece output end, said spreader unit operable to receive a flatwork piece at the input end and to spread and smooth the piece during movement thereof toward the output end,
   (b) a feeder unit including a longitudinal conveyor means having a work piece input end and a work piece output end, said work piece input end positioned rearwardly of the output end of the spreader unit,
   (c) a work piece transfer assembly positioned between the output end of the conveyor means of the spreader unit and the input end of the conveyer means of the feeder unit, said assembly including transverse means movable from adjacent the output end of the conveyer means of the spreader unit to the input end of the conveyer means of the feeder unit, said transverse means operable to receive and arrest the movement of the trailing end section of the work piece from the conveyer means of the spreader unit and to move said arrested trailing end section to the input end of the conveyer means of the feeder unit, and
   (d) control means for said transfer assembly operable in response to the position of the work piece on the conveyer means of the spreader unit to actuate said transfer assembly to move the transverse means adjacent the output end of the conveyer means of the spreader unit to receive and arrest the trailing end section of the work piece and to move said transverse means and said arrested trailing end section of the work piece to the input end of the conveyer means of the feeder unit.

6. In a machine for handling a sheet-like article,
   (a) frame means,
   (b) lever means pivotally mounted on said frame means for movement about an axis,
   (c) conveyer means mounted on said frame means for movement substantially normal to said pivotal axis of the lever means,
   (d) first roller means rotatably mounted on said frame means on an axis substantially parallel to the pivotal axis of said lever means, said first roller means engageable with said conveyer means,
   (e) drive means for moving said conveyer means and rotating said first roller means in the direction of movement of said conveyer means,
   (f) second roller means positioned adjacent said first roller means and rotatably mounted on said lever means on an axis substantially parallel to the pivotal axis of said lever means, and
   (g) control means for said lever means operable to pivot said lever means to move the second roller means into and out of engagement with said first roller means, 7. The machine defined in claim 6 including:
(a) beam means operatively connected to said lever means adjacent said second roller means, said beam means having a curved contour projected away from the mid-section of said second roller means.

8. In a machine for handling a sheet-like article,
(a) frame means,
(b) a first conveyer means mounted on said frame means for moving an article having a leading end section and a trailing end section in a longitudinal path, said first conveyer means having an input end and an output end,
(c) a second conveyer means mounted on said frame means adjacent the output end of said first conveyer means, said second conveyer means having an input end and an output end,
(d) first roller means rotatably mounted on said frame means and engageable with the second conveyer means adjacent the input end thereof,
(e) drive means for moving said second conveyer means and rotating said first roller means,
(f) lever means positioned between said first and second conveyer means and pivotally mounted on said frame means on an axis substantially parallel to said first roller means,
(g) second roller means normally positioned adjacent said first roller means and rotatably mounted on said lever means on an axis substantially parallel to the pivotal axis of said lever means, and
(h) control means for said lever means operable in response to the position of an article on said first conveyor means to move said lever means to place said second roller means adjacent the output end of said first conveyer means to receive the trailing end section of the article and to subsequently move said second roller means and trailing end section of the article into engagement with said first roller means whereby the trailing end section of the article is directed into engagement with the second conveyer means.

9. The machine defined in claim 8, wherein said first roller means includes:
(a) a spiral peripheral ribbon wound in opposite helical directions from the mid-section of the roller means for applying opposite lateral forces to the article positioned on the second conveyer means.

10. The machine defined in claim 8 including:
(a) beam means operatively connected to said lever means adjacent said second roller means, said beam means having a curved contour projected away from the mid-section of said second roller means.

11. A work piece transfer assembly comprising:
(a) frame means,
(b) a pair of spaced levers pivotally mounted at their mid-sections to the frame means,
(c) roll means extended between said levers and rotatably mounted on one end of each lever,
(d) control means mounted on the frame means and operatively connected to the other end of each lever, said control means operative to pivot said levers on said frame means,
(e) crank means pivotally connected at the mid-section thereof to said one end of each lever,
(f) a beam connected to one end of said crank means, said beam having a curved contour extended away from the mid-section of said roll means,
(g) link means pivotally connected at one end thereof to the other end of said crank means and connected at the other end to the frame means whereby upon pivotal movement of said levers the crank means are pivoted on said levers to move the beam relative to the roll means.

12. The work piece transfer assembly defined in claim 11 including:
(a) brake means mounted on one of said levers and engageable with said roll means for retarding rotation of said roll means.

13. The work piece transfer assembly defined in claim 11 including:
(a) finger means secured to said beam and projected in opposite outward directions from the mid-section of the beam.

References Cited by the Examiner

UNITED STATES PATENTS

| | | | |
|---|---|---|---|
| 249,505 | 11/1881 | Cottrell | 271—70 |
| 1,568,401 | 1/1926 | Griffith | 38—143 X |
| 1,615,813 | 1/1927 | Romine | 214—152 |
| 1,891,782 | 12/1932 | Sager | 38—143 |
| 1,912,466 | 6/1933 | Remington | 38—143 X |
| 2,300,890 | 11/1942 | Hamilton | 38—143 X |
| 2,585,834 | 2/1952 | Pocock | 38—143 |
| 2,624,138 | 1/1953 | Taylor | 38—143 |
| 2,740,457 | 4/1956 | Wood. | |
| 2,940,194 | 6/1960 | Kinzelman | 38—143 X |
| 3,134,183 | 5/1964 | Duflot | 38—143 |
| 3,160,128 | 12/1964 | Heidt | 112—219 |
| 3,163,415 | 12/1964 | Atchison | 271—68 |
| 3,166,206 | 1/1965 | Porter | 214—152 |

FOREIGN PATENTS

| | | |
|---|---|---|
| 1,321,175 | 2/1963 | France. |
| 220,346 | 8/1924 | Great Britain. |

JORDAN FRANKLIN, *Primary Examiner.*

FRANK J. COHEN, M. J. COLITZ, *Assistant Examiners.*